United States Patent
Pringle, IV et al.

(10) Patent No.: US 11,583,876 B2
(45) Date of Patent: Feb. 21, 2023

(54) POSITIVE DISPLACEMENT END EFFECTOR WITH MULTIPLE CARTRIDGES

(71) Applicant: The Boeing Company, Chicago, IL (US)

(72) Inventors: John Walter Pringle, IV, Torrance, CA (US); Angelica Davancens, Reseda, CA (US); Derek Nelson, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/470,508

(22) Filed: Sep. 9, 2021

(65) Prior Publication Data

US 2022/0288614 A1    Sep. 15, 2022

Related U.S. Application Data

(60) Provisional application No. 63/161,201, filed on Mar. 15, 2021.

(51) Int. Cl.
*B05B 7/26* (2006.01)
*B01F 33/84* (2022.01)
(Continued)

(52) U.S. Cl.
CPC .............. *B05B 7/26* (2013.01); *B01F 25/431* (2022.01); *B01F 33/84* (2022.01);
(Continued)

(58) Field of Classification Search
CPC . B05B 7/26; B05B 7/0408; B05B 7/12; B01F 25/431; B01F 33/84;
(Continued)

(56) References Cited

U.S. PATENT DOCUMENTS

| 4,433,795 A * | 2/1984 | Maiefski ............... G07F 13/065 |
| | | 222/14 |
| 9,316,216 B1 * | 4/2016 | Cook ..................... F04B 13/02 |

(Continued)

FOREIGN PATENT DOCUMENTS

| DE | 102009049286 A1 | 5/2011 |
| EP | 0956908 A1 | 11/1999 |
| EP | 3738680 A1 | 11/2020 |

OTHER PUBLICATIONS

European Search Report Application No. 22154672.4, dated Aug. 26, 2022, 5 pages.

*Primary Examiner* — Vishal Pancholi
(74) *Attorney, Agent, or Firm* — Kwan & Olynick LLP

(57) ABSTRACT

A robot end effector (100) for dispensing an extrudable substance (102) comprises cartridge bays (122). Each one of the cartridge bays (122) is shaped to receive one of two-part cartridges (104). Each of the two-part cartridges (104) comprises a cartridge outlet (109). The robot end effector (100) also comprises a head assembly (150), comprising pairs of fittings (152). Each pair of the pairs of fittings (152) is configured to selectively supply compressed air from a pressure source (199) to contents of one of the two-part cartridges (104) when the two-part cartridges (104) are received by the cartridge bays (122) and the cartridge bays (122) are translated along a first axis (190) and along a second axis (192) so that the cartridge outlet (109) of the corresponding one of the two-part cartridges (104) is in fluidic communication with the mixer inlet (103).

20 Claims, 9 Drawing Sheets

(51) Int. Cl.
*B01F 35/71* (2022.01)
*B01F 25/431* (2022.01)
*B05B 7/04* (2006.01)
*B05B 7/12* (2006.01)
*B05C 5/02* (2006.01)
*B25J 15/00* (2006.01)
*B01F 101/36* (2022.01)

(52) U.S. Cl.
CPC ...... *B01F 35/71745* (2022.01); *B05B 7/0408* (2013.01); *B05B 7/12* (2013.01); *B05C 5/0225* (2013.01); *B25J 15/0019* (2013.01); *B01F 2101/36* (2022.01)

(58) Field of Classification Search
CPC ........... B01F 35/71745; B01F 2101/36; B05C 5/0225; B05C 5/0216
See application file for complete search history.

(56) References Cited

U.S. PATENT DOCUMENTS

| | | | |
|---|---|---|---|
| 2004/0255560 A1* | 12/2004 | Noble | B29B 7/80 |
| | | | 53/469 |
| 2016/0114348 A1 | 4/2016 | Cheung et al. | |
| 2018/0045745 A1* | 2/2018 | Holmes | B01L 3/0279 |
| 2019/0151882 A1* | 5/2019 | Tritt | G05B 15/02 |
| 2020/0222319 A1* | 7/2020 | Rönnback | B01F 33/84 |

* cited by examiner

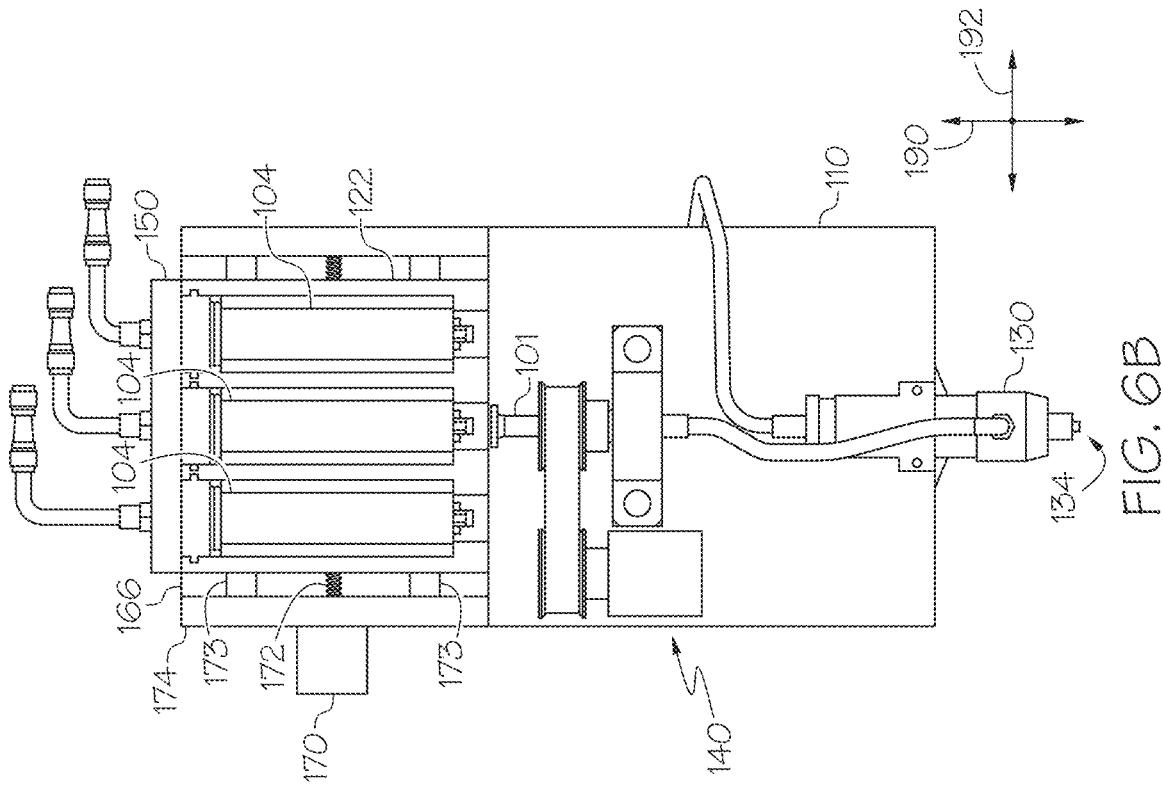
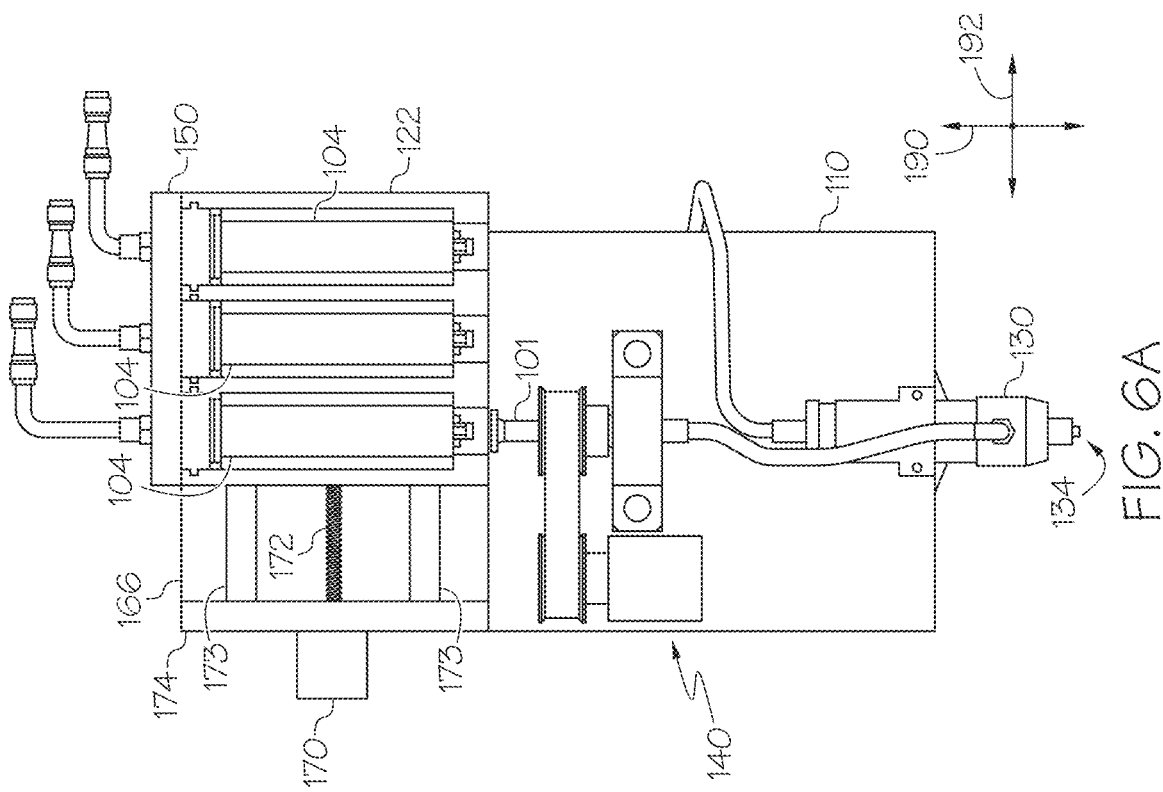

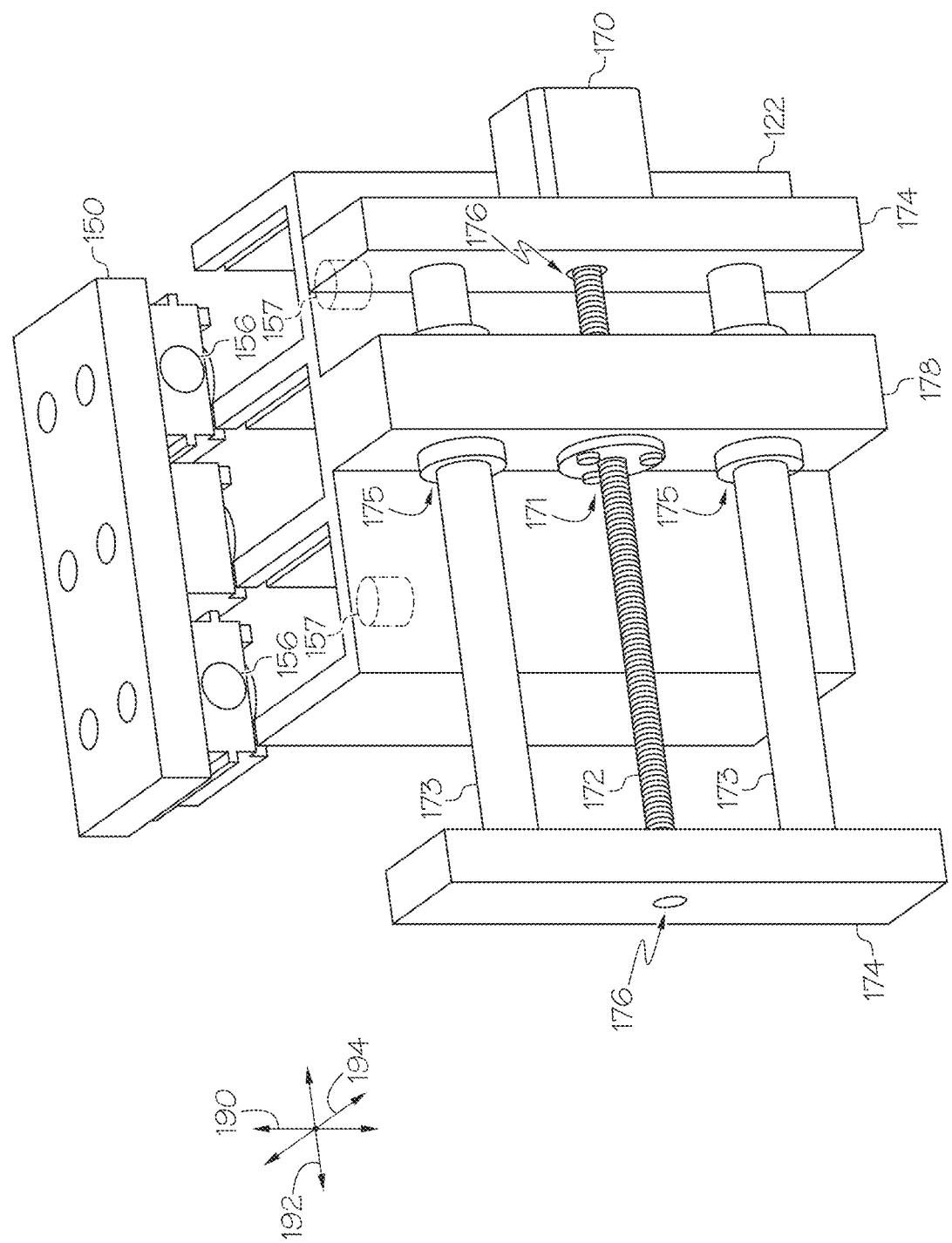

POSITIVE DISPLACEMENT END EFFECTOR WITH MULTIPLE CARTRIDGES

CROSS-REFERENCE TO RELATED APPLICATIONS

This application claims the benefit under 35 U.S.C. § 119(e) of U.S. Provisional Patent Application 63/161,201, filed on 2021 Mar. 15, which is incorporated herein by reference in its entirety for all purposes.

TECHNICAL FIELD

Described herein are apparatuses and methods for depositing an extrudable substance onto a surface.

BACKGROUND

During assembly of a structure, such as an aircraft or a component thereof, an extrudable substance, such as sealant, must often be deposited onto a surface of the structure. It is desirable to fully automate such deposition of the extrudable substance to reduce cost and manufacturing lead time. However, space constraints, in many instances imposed by the geometry of the structure, make automating the deposition of extrudable substances difficult. For example, a robot may need to deposit the extrudable substance onto a surface, located in a confined space within the structure, such as inside an airplane wing box that, at the tip, is only several inches high. Automated deposition of extrudable substances is further complicated by the fact that the robot must often enter the confined space through a small access port and must navigate around obstacles while manipulating an end effector to deposit the extrudable substance onto desired locations along the surface of the structure.

SUMMARY

Accordingly, apparatuses and methods, intended to address at least the above-identified concerns, would find utility.

The following is a non-exhaustive list of examples of the subject matter, disclosed herein.

Disclosed herein is a robot end effector for dispensing an extrudable substance. The robot end effector comprises a chassis, a mixer mount, extending from the chassis and configured to rotatably receive a static mixer that comprises a mixer inlet and a mixer outlet, which is in fluidic communication with the mixer inlet. The robot end effector also comprises a plurality of cartridge bays, extending from the chassis. Each one of the plurality of cartridge bays is shaped to receive a corresponding one of a plurality of two-part cartridges. Each one of the plurality of two-part cartridges comprises a cartridge outlet. Fluidic communication between the cartridge outlet of a selected one of the plurality of two-part cartridges and the mixer inlet is established when the plurality of cartridge bays is moved to a predetermined position with respect to the chassis, linearly along a first axis and linearly along a second axis, which is transverse to the first axis. The robot end effector further comprises a drive mechanism, attached to the chassis and selectively operable to rotate the static mixer relative to the cartridge bays when the static mixer is received by the mixer mount. The robot end effector additionally comprises a dispensing valve, attached to the chassis and comprising a valve inlet and a valve outlet. The valve outlet is in selective fluidic communication with the valve inlet, and the valve inlet is in fluidic communication with the mixer outlet when the static mixer is received by the mixer mount. The robot end effector also comprises a head assembly, comprising a plurality of pairs of fittings. Each pair of the plurality of pairs of fittings is configured to selectively supply compressed air from a pressure source to contents of a corresponding one of the plurality of two-part cartridges when the plurality of two-part cartridges is received by the plurality of cartridge bays, and the plurality of cartridge bays is translated along the first axis and along the second axis relative to the chassis so that the cartridge outlet of the corresponding one of the plurality of two-part cartridges is in fluidic communication with the mixer inlet.

The method provides for depositing the extrudable substance, from the cartridge, through the nozzle, to the surface of a workpiece, for example, located in confined space. The configuration of the sleeve and the cartridge reduces the size requirements for storage of the extrudable substance and enables the linear actuator and a portion of the valve to be located within the sleeve. The push-lock pressure cap enables pressurization of an internal volume located within the cartridge, which drives the annular plunger. Rotation of the sleeve controls a position of the nozzle relative to the housing and the surface. The valve being communicatively coupled directly to the cartridge reduces wasted amounts of the extrudable substance, for example, during replacement of the cartridge and/or a purging operation.

BRIEF DESCRIPTION OF THE DRAWINGS

Reference will now be made to the accompanying drawings, which are not necessarily drawn to scale, and where like reference characters designate the same or similar parts throughout the several views. In the drawings:

FIG. 6A is a schematic, front elevation view of the robot end effector of FIG. 1, showing the static mixer of FIGS. 5A and 5B positioned beneath a first cartridge bay of the robot end effector, according to one or more examples of the subject matter, disclosed herein;

FIG. 6B is a schematic, front elevation view of the robot end effector of FIG. 1, showing the static mixer of FIGS. 5A and 5B positioned beneath a second cartridge bay of the robot end effector, according to one or more examples of the subject matter, disclosed herein;

FIG. 6C is a schematic, perspective view of the portion of the robot end effector shown in FIGS. 6A and 6B, showing a carrier and a support attached to a plurality of cartridge bays, according to one or more examples of the subject matter, disclosed herein.

Figure 1:
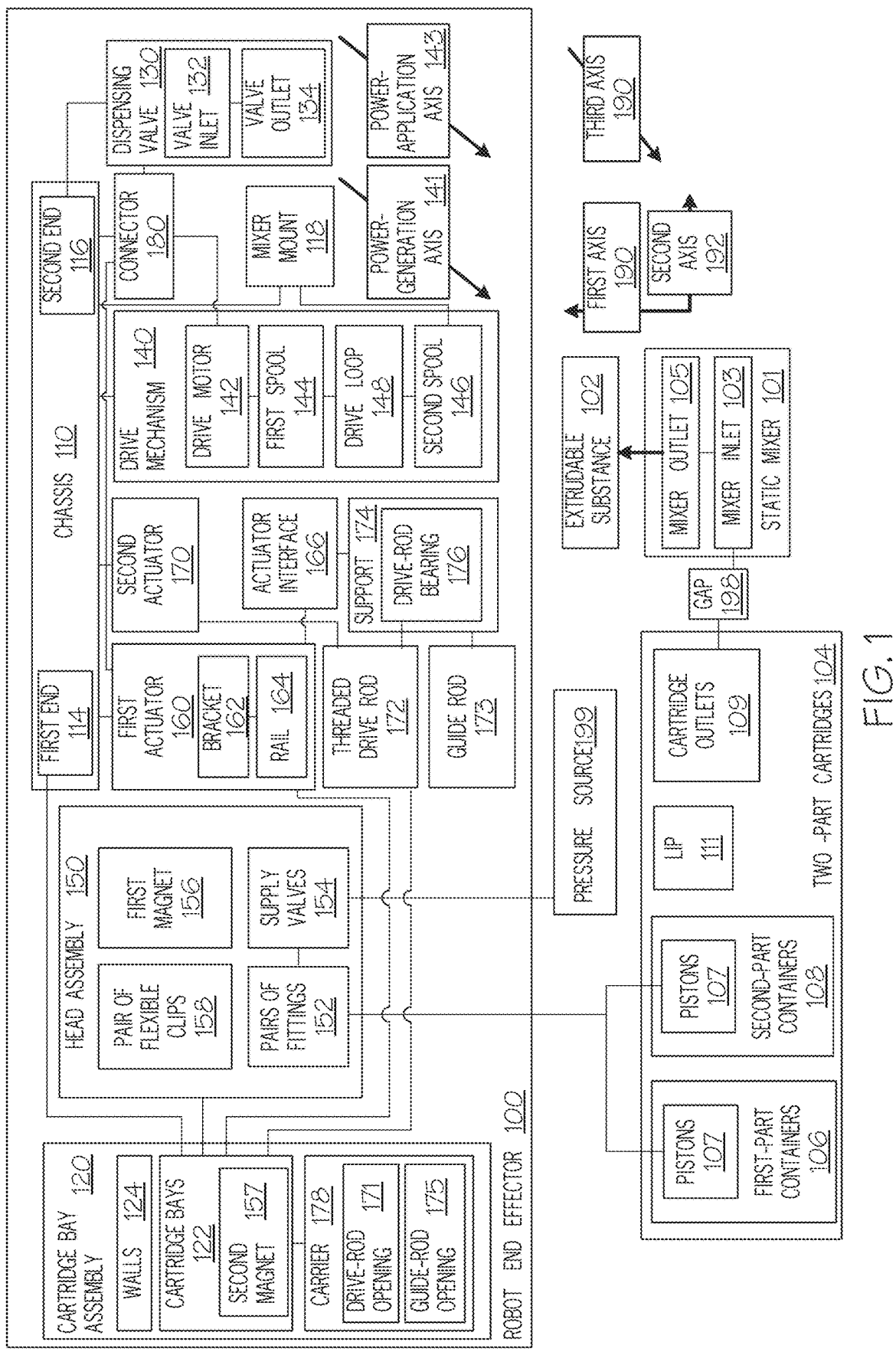
FIG. 1 is a block diagram of a robot end effector for dispensing an extrudable substance, according to one or more examples of the subject matter, disclosed herein.
Figure 4B:
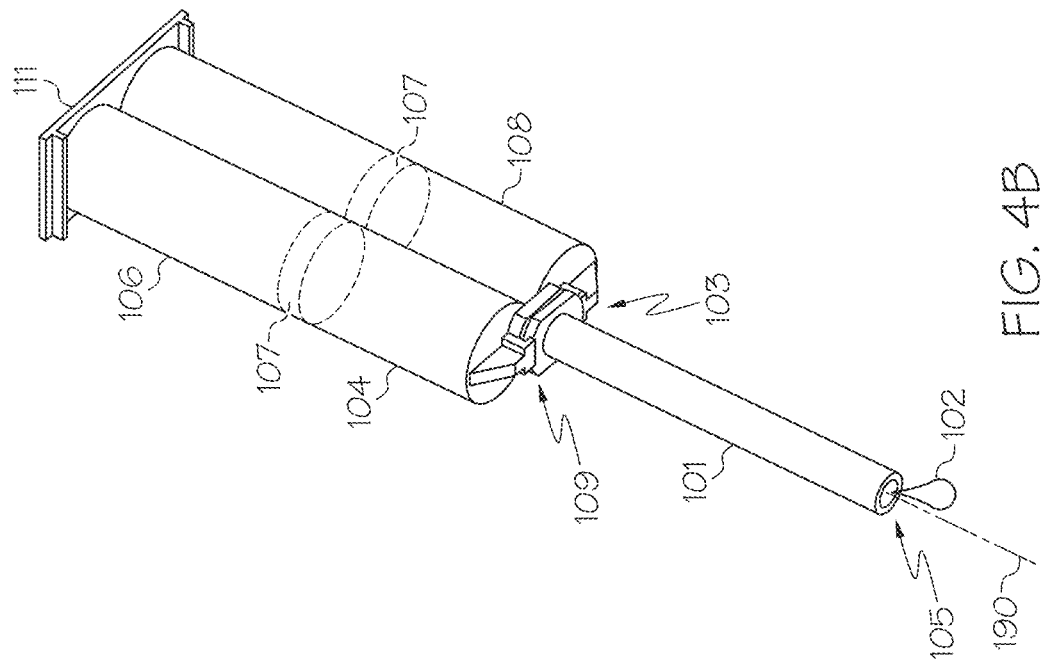
FIG. 4B is a schematic, perspective, assembled view of the two-part cartridge and static mixer of FIG. 4A, according to one or more examples of the subject matter, disclosed herein.
Figure 4A:
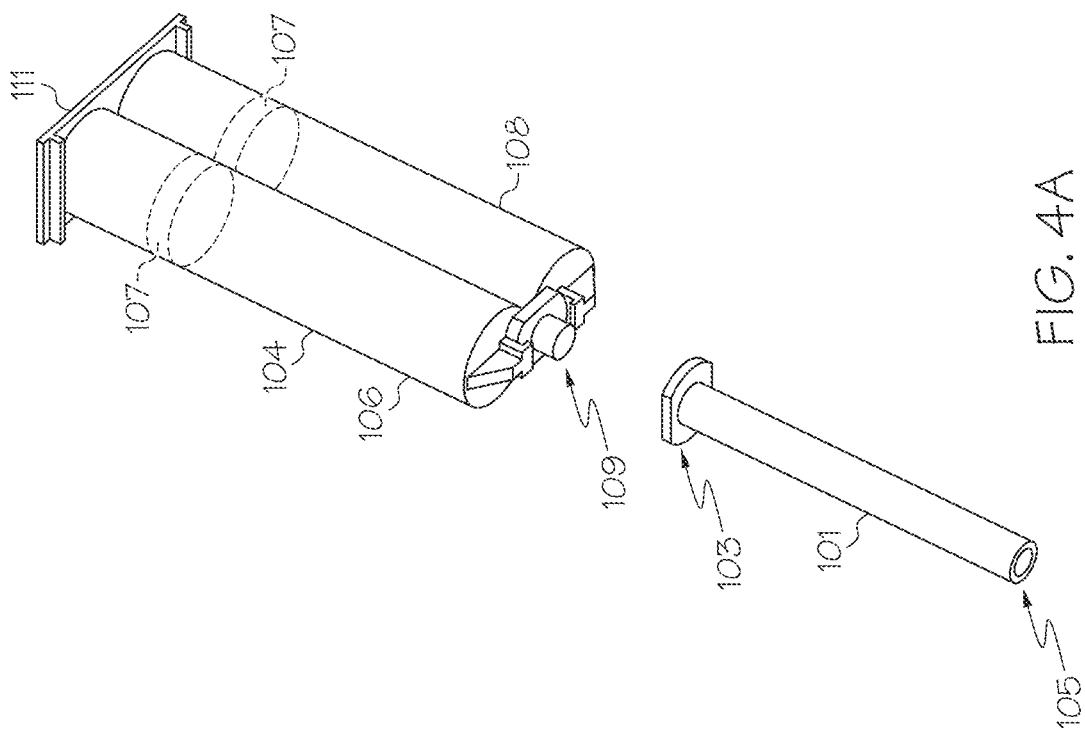
FIG. 4A is a schematic, perspective, exploded view of a two-part cartridge and static mixer for use with the robot end effector of FIG. 1, according to one or more examples of the subject matter, disclosed herein.
Figure 5A:
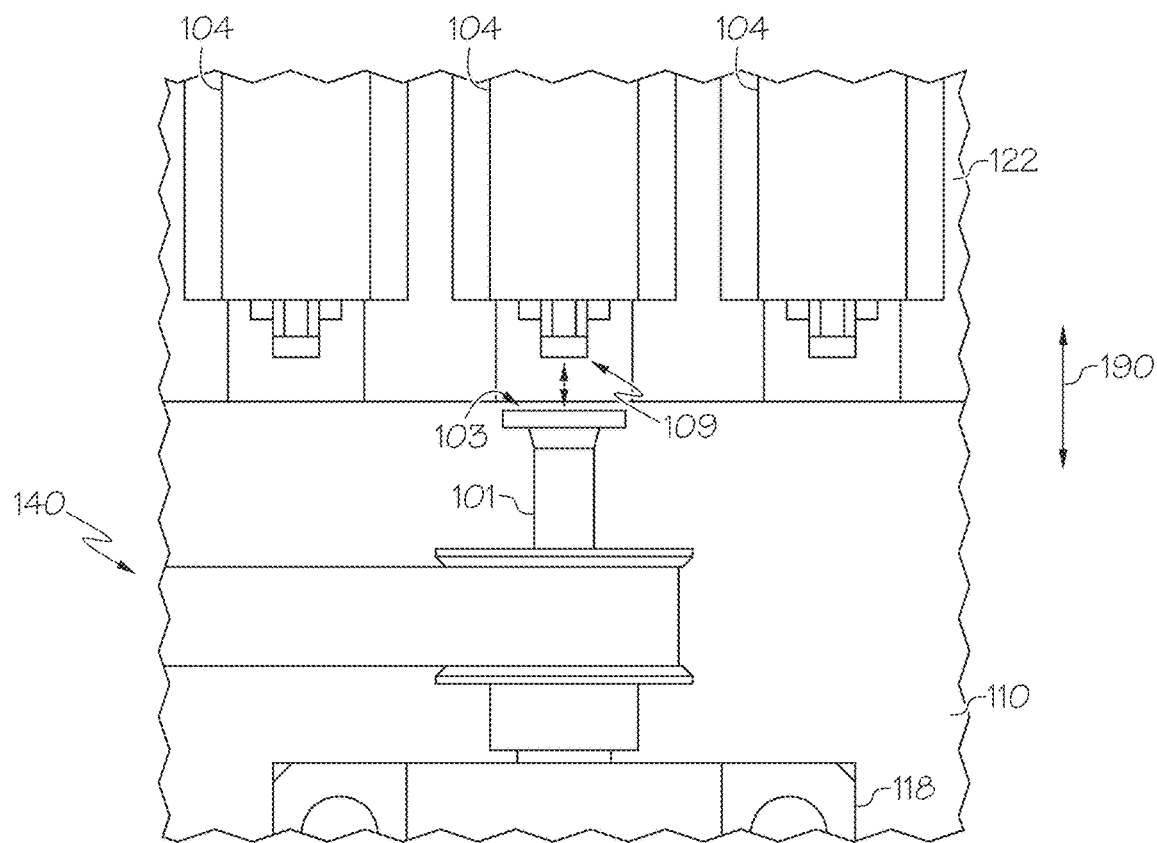
FIG. 5A is a schematic, back, elevation view of a static mixer of the robot end effector of FIG. 1, positioned for attachment to the two-part cartridge of FIG. 4B, according to one or more examples of the subject matter, disclosed herein.
Figure 5B:
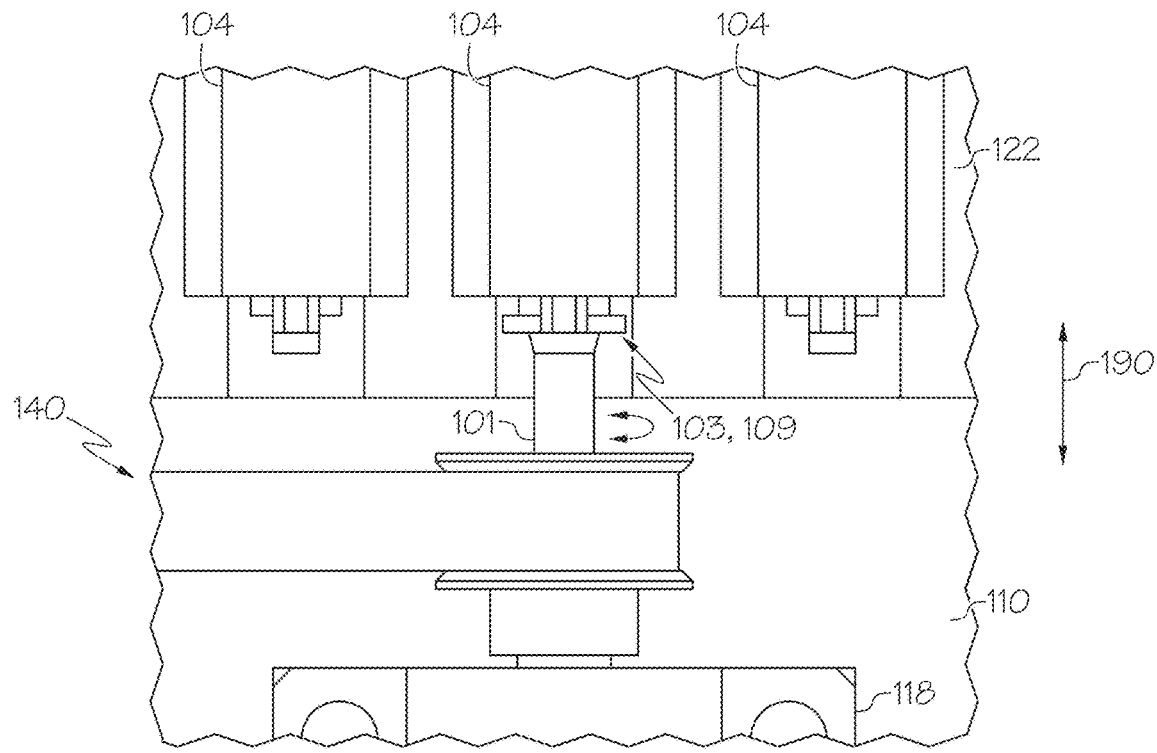
FIG. 5B is a schematic, back, elevation view of the static mixer of FIG. 5A, attached to the two-part cartridge of FIG. 5A, according to one or more examples of the subject matter, disclosed herein.
Figure 7B:
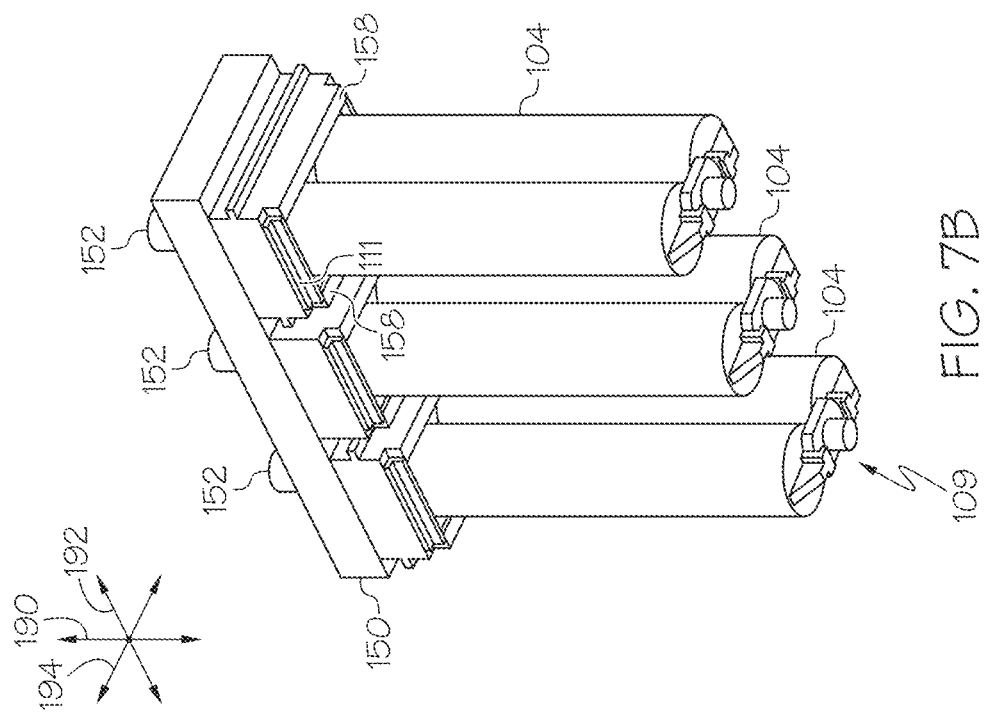
Figure 7A:
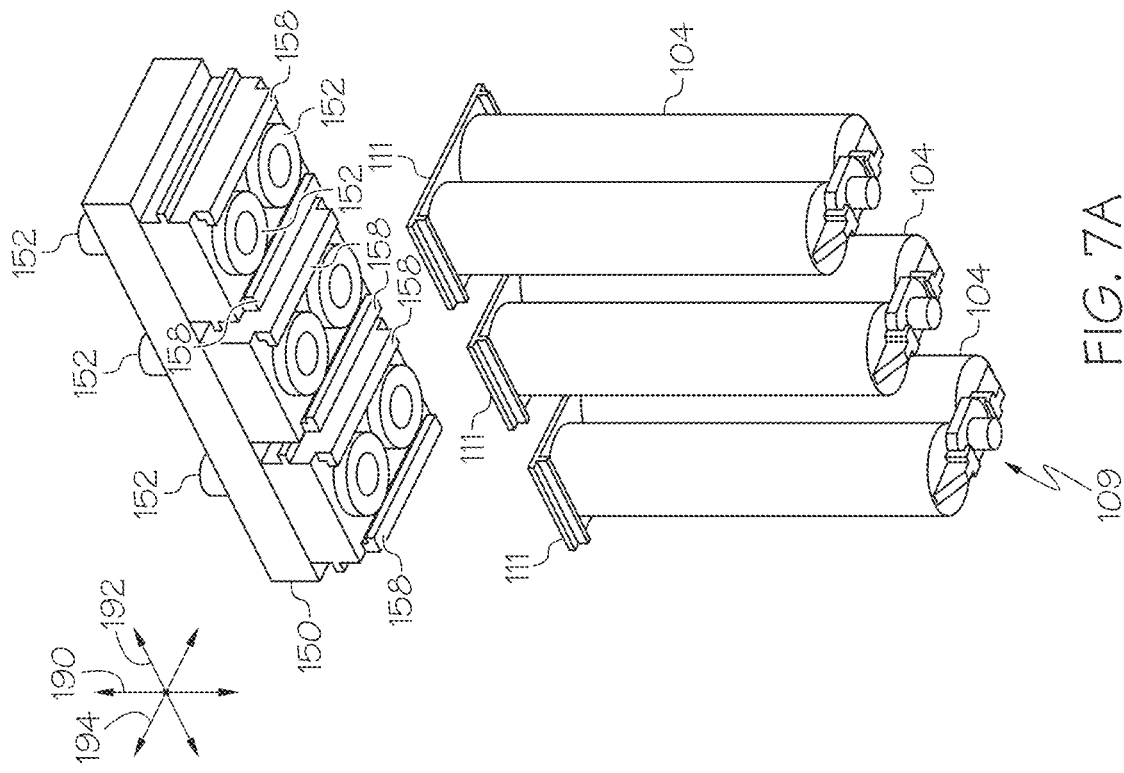
Figure 7C:
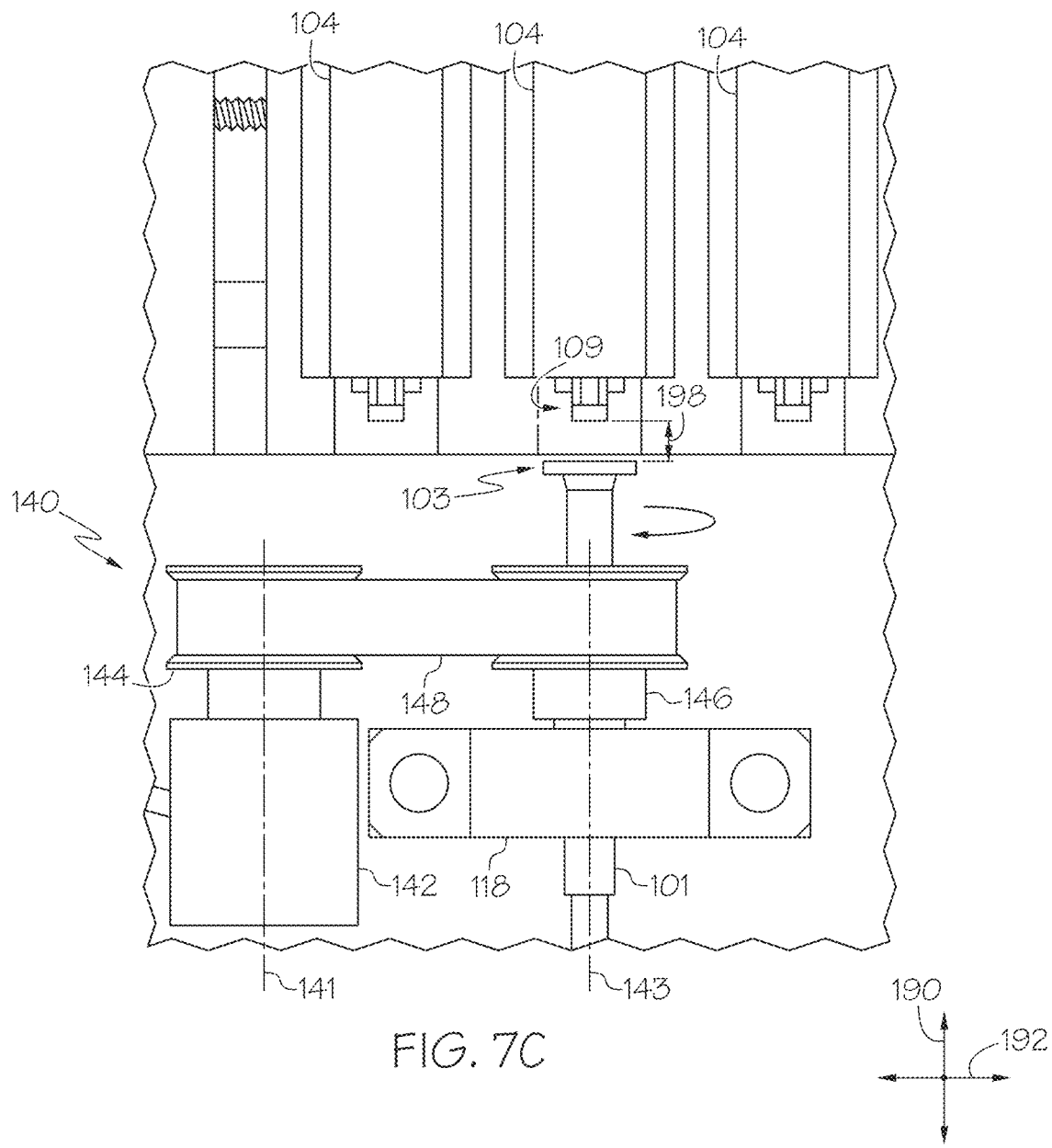

FIG. 7A is a schematic, exploded, perspective view of a plurality of the two-part cartridges of FIG. 4A and a head assembly, according to one or more examples of the subject matter, disclosed herein;

FIG. 7B is a schematic, perspective view of the two-part cartridges of FIG. 7A attached to the head assembly of FIG. 7A, according to one or more examples of the subject matter, disclosed herein; and FIG. 7C is a schematic, front elevation view of a portion of the robot end effector of FIG. 1, showing the two-part cartridges of FIG. 4A received in cartridge bays of the robot end effector, and showing the static mixer of FIGS. 5A and 5B positioned beneath the second cartridge bay, according to one or more examples of the subject matter, disclosed herein.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter, disclosed herein, are provided below.

Referring generally to FIG. 1, robot end effector 100 for dispensing extrudable substance 102 is disclosed. Robot end effector 100 comprises chassis 110 and mixer mount 118, extending from chassis 110 and configured to rotatably receive static mixer 101 that comprises mixer inlet 103 and mixer outlet 105, which is in fluidic communication with mixer inlet 103. Robot end effector 100 also comprises cartridge bays 122, extending from chassis 110. Each one of cartridge bays 122 is shaped to receive a corresponding one of two-part cartridges 104. Each one of two-part cartridges 104 comprises cartridge outlet 109. Fluidic communication between cartridge outlet 109 of a selected one of two-part cartridges 104 and mixer inlet 103 is established when cartridge bays 122 are moved to a predetermined position with respect to chassis 110, linearly along first axis 190 and linearly along second axis 192, which is transverse to first axis 190. Robot end effector 100 further comprises drive mechanism 140, attached to chassis 110 and selectively operable to rotate static mixer 101 relative to cartridge bays 122 when static mixer 101 is received by mixer mount 118. Robot end effector 100 additionally comprises dispensing valve 130, attached to chassis 110 and comprising valve inlet 132 and valve outlet 134. Valve outlet 134 is in selective fluidic communication with valve inlet 132, and valve inlet 132 is in fluidic communication with mixer outlet 105 when static mixer 101 is received by mixer mount 118. Robot end effector 100 also comprises head assembly 150, comprising pairs of fittings 152. Each pair of pairs of fittings 152 is configured to selectively supply compressed air from pressure source 199 to contents of a corresponding one of plurality of two-part cartridges 104 when plurality of two-part cartridges 104 is received by cartridge bays 122, and cartridge bays 122 are translated along first axis 190 and along second axis 192 relative to chassis 110 so that cartridge outlet 109 of the corresponding one of two-part cartridges 104 is in fluidic communication with mixer inlet 103. The preceding portion of this paragraph characterizes example one of the subject matter, disclosed herein.

Robot end effector 100 provides for depositing extrudable substance 102 from two-part cartridges 104 in a single automated deposition process, eliminating a need to pause, recover, and reload robot end effector 100 each time a single two-part cartridge is emptied. Cartridge bays 122 enable loading and retention of two-part cartridges 104 on robot end effector 100. Cartridge bays 122 are configured to move a selected one of two-part cartridges 104 to the predetermined position with respect to chassis 110 and static mixer 101, such that cartridge outlet 109 of the selected one of two-part cartridges 104 is aligned with mixer inlet 103 of static mixer 101, enables each of two-part cartridges 104 to be selectively positioned for extrusion of the contents into static mixer 101 in one-at-a-time fashion. Head assembly 150 distributes pressure from pressure source 199 selectively to each of two-part cartridges 104 to enable extrusion of extrudable substance 102 selectively from one of two-part cartridges 104 that is in the predetermined position for fluid communication with static mixer 101. Once the selected one of two-part cartridges 104 has been emptied of extrudable substance 102, cartridge bays 122 are configured to move a next selected one of two-part cartridges 104 to the predetermined position with respect to chassis 110 and static mixer 101 such that cartridge outlet 109 of the next selected one of two-part cartridges 104 is aligned with mixer inlet 103 of static mixer 101. Drive mechanism 140 is selectively operable to rotate static mixer 101 relative to cartridge bays 122 when static mixer 101 is received by mixer mount 118.

In one or more examples, two-part cartridges 104 are commercial off-the-shelf items that each include first-part container 106 and second-part container 108. The contents of first-part container 106 and the contents of second-part container 108 are configured to be mixed together to yield extrudable substance 102, such as an adhesive. Typically, the contents of first-part container 106 and second-part container 108 must be kept separate until just before use because extrudable substance 102 solidifies soon after mixing, for example, in less than an hour. First-part container 106 and second-part container 108 each include piston 107 disposed internally within and configured to force the respective contents of first-part container 106 and second-part container 108 out of cartridge outlet 109. Each static mixer 101 is typically packaged with a two-part cartridge and is a tube, attachable to cartridge outlet 109. Each static mixer typically includes mixing vanes, configured to enhance mixing of the contents of first-part container 106 and second-part container 108 as they travel through the static mixer, such that extrudable substance 102 is suitably homogeneous upon exit from mixer outlet 105 of static mixer 101.

Figure 2:
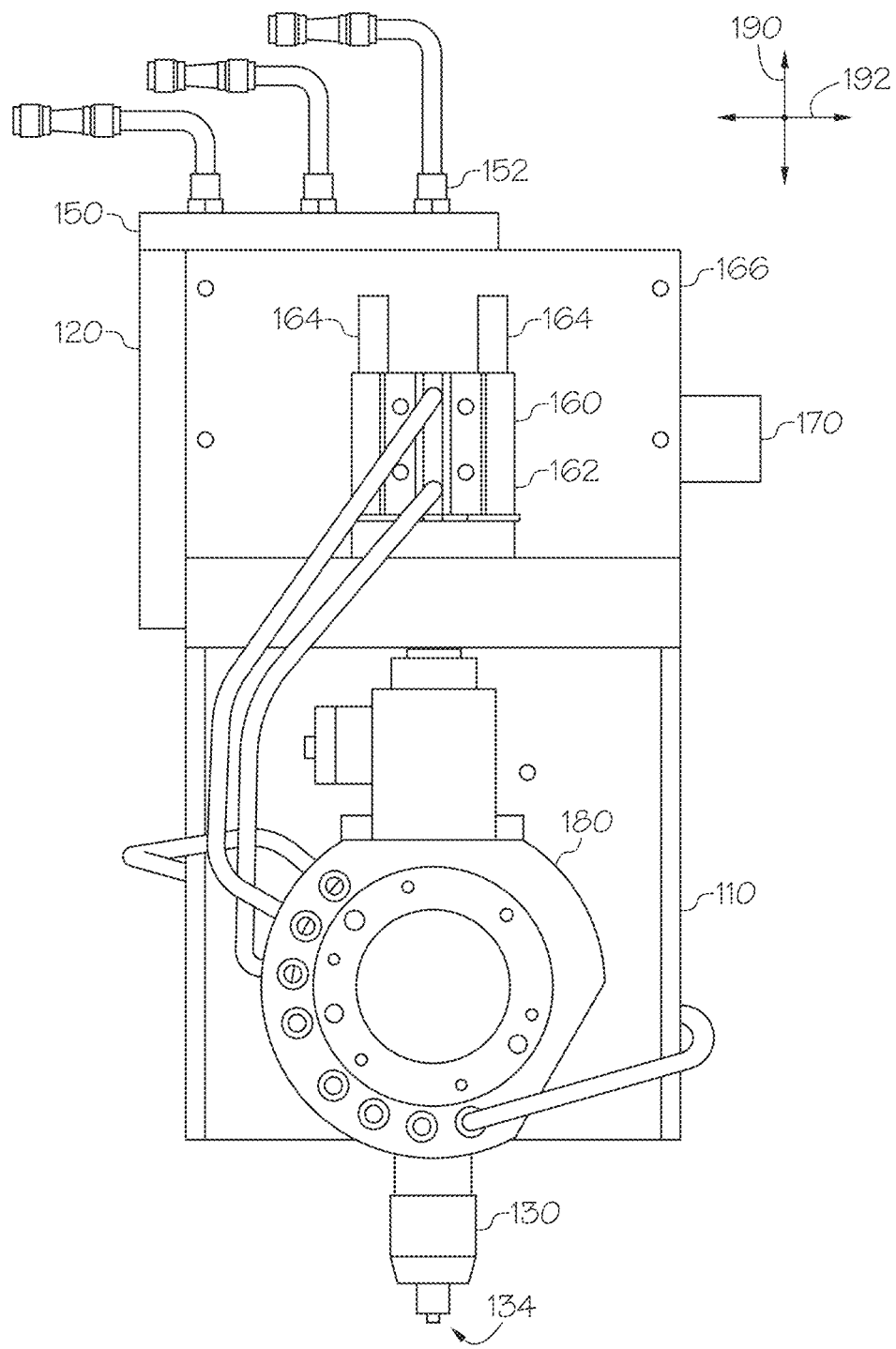
FIG. 2 is a schematic, back, elevation view of the robot end effector of FIG. 1, according to one or more examples of the subject matter, disclosed herein.

Referring generally to FIG. 1 and particularly to, e.g., FIGS. 2, 5A, and 5B, robot end effector 100 further comprises first actuator 160, attached to chassis 110 and operable to move cartridge bays 122 bi-directionally with respect to chassis 110, linearly along first axis 190. The preceding portion of this paragraph characterizes example two of the subject matter, disclosed herein, where example two also encompasses example one, above.

First actuator 160 enables bi-directional movement of cartridge bays 122 relative to chassis 110 along first axis 190 such that, when a selected one of cartridge bays 122 is moved into alignment with static mixer 101, cartridge outlet 109 of the corresponding one of two-part cartridges 104 is movable along first axis 190 into and out of fluid communication with mixer inlet 103.

Referring generally to FIG. 1 and particularly to, e.g., FIGS. 2, 5A, and 5B, first actuator 160 comprises bracket 162, fixed to one of chassis 110 or to cartridge bays 122, and at least one rail 164, fixed to the other of chassis 110 or cartridge bays 122 and oriented parallel to first axis 190. At least one rail 164 is coupled to bracket 162 and is movable relative to bracket 162. The preceding portion of this paragraph characterizes example three of the subject matter, disclosed herein, where example three also encompasses example two, above.

First actuator 160 includes bracket 162 and at least one rail 164 that enable bi-directional movement of cartridge bays 122 relative to chassis 110 along first axis 190 such that, when a selected one of cartridge bays 122 is moved into alignment with static mixer 101, cartridge outlet 109 of the corresponding one of two-part cartridges 104 is movable along first axis 190 into and out of fluid communication with mixer inlet 103. Bracket 162 is fixed to one of chassis 110 or cartridge bays 122, and at least one rail 164 is fixed to the other of chassis 110 or cartridge bays 122 and oriented parallel to first axis 190. At least one rail 164 is coupled to bracket 162 and is movable relative to bracket 162.

Referring generally to FIG. 1 and particularly to, e.g., FIG. 2, first actuator 160 is configured to be pneumatically activated. The preceding portion of this paragraph characterizes example four of the subject matter, disclosed herein, where example four also encompasses example two or three, above.

Pneumatic actuation of first actuator 160 enables accurate positioning of cartridge bays 122 along first axis 190 in a relatively inexpensive fashion, for example, using air, supplied through connector 180 of robot end effector 100.

Referring generally to FIG. 1 and particularly to, e.g., FIG. 2, robot end effector 100 further comprises connector 180, attached to chassis 110. Dispensing valve 130 and first actuator 160 are controllable by signals, received through connector 180. The preceding portion of this paragraph characterizes example five of the subject matter, disclosed herein, where example five also encompasses any one of examples two to four, above.

Connector 180 facilitates simple and efficient electrical connection of dispensing valve 130, first actuator 160, and second actuator 170 to a source of control signals. In one or more examples, the control signals control first actuator 160 and second actuator 170 to move cartridge bays 122 relative to chassis 110 along first axis 190 and second axis 192 to the predetermined position with respect to chassis 110 and static mixer 101, and/or to decouple cartridge outlet 109 from mixer inlet 103 and move a next one of cartridge bays 122 into alignment with static mixer 101. In one or more examples, the control signals control dispensing valve 130 to deposit extrudable substance 102 via valve outlet 134.

In one or more examples, connector 180 is a quick-change connector, configured to interface mechanically with an arm of a robot (not shown), so as to attach robot end effector 100 physically to the robot, and electrically with a control system (not shown) of the robot, so as to enable and integrate control of dispensing valve 130, first actuator 160, and second actuator 170 with the control logic of the robot.

Figure 3:
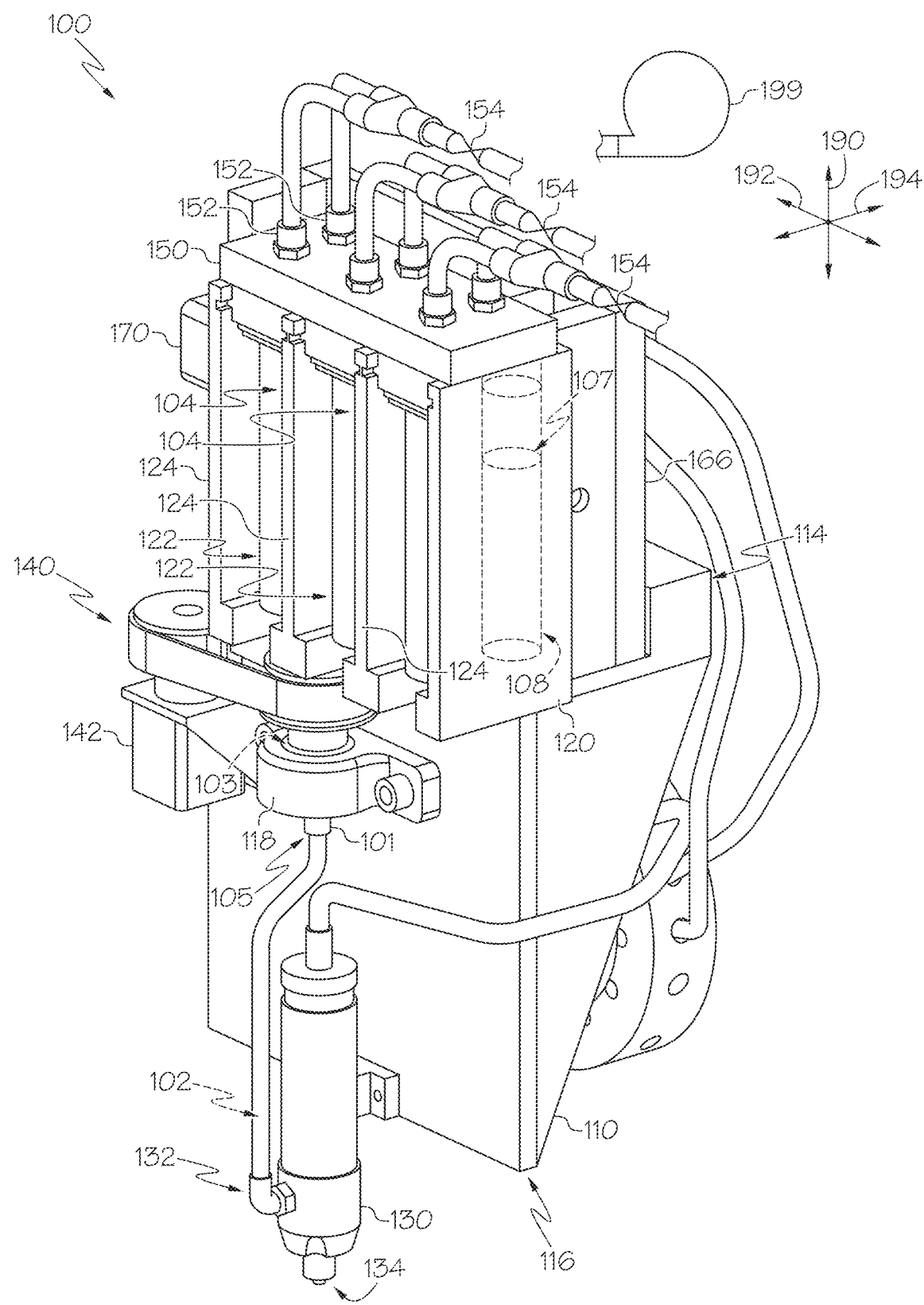
FIG. 3 is a schematic, perspective view of the robot end effector of FIG. 1, according to one or more examples of the subject matter, disclosed herein.

Referring generally to FIG. 1 and particularly to, e.g., FIGS. 3, 6A, and 6B, robot end effector 100 further comprises second actuator 170, attached to chassis 110 and operable to move cartridge bays 122 bi-directionally with respect to chassis 110, linearly along second axis 192. The preceding portion of this paragraph characterizes example six of the subject matter, disclosed herein, where example six also encompasses any one of examples two to five, above.

Second actuator 170 being operable to bi-directionally move cartridge bays 122 relative to chassis 110 along second axis 192 enables each of cartridge bays 122 to be selectively positioned in alignment with static mixer 101.

Referring generally to FIG. 1 and particularly to, e.g., FIGS. 3, 6A, and 6B, robot end effector 100 further comprises actuator interface 166. First actuator 160 is configured to translate actuator interface 166 relative to chassis 110. Second actuator 170 is operable to move cartridge bays 122 bi-directionally with respect to actuator interface 166, linearly along second axis 192. The preceding portion of this paragraph characterizes example seven of the subject matter, disclosed herein, where example seven also encompasses example six, above.

Second actuator 170 being operable to bi-directionally move cartridge bays 122 relative to chassis 110 along second axis 192 enables each of cartridge bays 122 to be selectively positioned in alignment with static mixer 101. Actuator interface 166 enables mechanically simple and effective cooperation between first actuator 160 and second actuator 170 to move cartridge bays 122 to the predetermined position with respect to chassis 110 to establish fluidic communication between cartridge outlet 109 of the selected one of two-part cartridges 104 and mixer inlet 103.

Referring generally to FIG. 1 and particularly to, e.g., FIGS. 3, 6A, 6B, and 6C, robot end effector 100 further comprises threaded drive rod 172, operatively interconnecting second actuator 170 and cartridge bays 122. Second actuator 170 is operable to selectively rotate threaded drive rod 172 to selectively move cartridge bays 122 relative to chassis 110, linearly along second axis 192. The preceding portion of this paragraph characterizes example eight of the subject matter, disclosed herein, where example eight also encompasses example seven, above.

Second actuator 170 and threaded drive rod 172 cooperate to provide a mechanically simple and efficient transfer of force from second actuator 170 to cartridge bays 122.

Referring generally to FIG. 1 and particularly to, e.g., FIGS. 3, 6A, 6B, and 6C, robot end effector 100 further comprises support 174, fixed to actuator interface 166 and comprising drive-rod bearing 176, configured to rotationally support threaded drive rod 172. Robot end effector also comprises carrier 178, fixed to cartridge bays 122 and comprising drive-rod opening 171, though which threaded drive rod 172 is threadably received. The preceding portion of this paragraph characterizes example nine of the subject matter, disclosed herein, where example nine also encompasses example eight, above.

Threaded drive rod 172, support 174, drive-rod bearing 176, carrier 178, and drive-rod opening 171 cooperate to provide a mechanically simple and efficient transfer of force from second actuator 170 to cartridge bays 122.

Referring generally to FIG. 1 and particularly to, e.g., FIGS. 3, 6A, 6B, and 6C, robot end effector 100 further comprises guide rod 173, fixed to support 174 and oriented parallel to threaded drive rod 172. Carrier 178 further comprises guide-rod opening 175, and guide rod 173 is slidably received through guide-rod opening 175. The preceding portion of this paragraph characterizes example ten of the subject matter, disclosed herein, where example ten also encompasses example nine, above.

Threaded drive rod 172, support 174, drive-rod bearing 176, carrier 178, drive-rod opening 171, guide rod 173, and guide-rod opening 175 cooperate to provide a mechanically simple and efficient transfer of force from second actuator 170 to cartridge bays 122.

Referring generally to FIG. 1 and particularly to, e.g., FIGS. 3, 6A, 6B, and 6C, second actuator 170 is a stepper motor. The preceding portion of this paragraph characterizes example eleven of the subject matter, disclosed herein, where example eleven also encompasses any one of examples six to ten, above.

Implementation of second actuator 170 as a stepper motor enables precise and accurate positioning cartridge bays 122 along second axis 192.

Referring generally to FIG. 1 and particularly to, e.g., FIGS. 3, 6A, 6B, and 6C, head assembly 150 is attached directly to cartridge bays 122. The preceding portion of this paragraph characterizes example twelve of the subject matter, disclosed herein, where example twelve also encompasses any one of examples one to eleven, above.

Head assembly 150 being attached directly to cartridge bays 122 reduces a mechanical complexity of robot end effector 100 and facilitates easy insertion and removal of two-part cartridges 104 from robot end effector 100.

Referring generally to FIG. 1 and particularly to, e.g., FIG. 6C, head assembly 150 comprises at least one first magnet 156, and cartridge bays 122 comprises at least one second magnet 157, configured to be magnetically coupled with at least one first magnet 156. The preceding portion of this paragraph characterizes example thirteen of the subject matter, disclosed herein, where example thirteen also encompasses any one of examples one to twelve, above.

Attaching head assembly 150 to cartridge bays 122 with first magnet 156 and second magnet 157 reduces a mechanical complexity of robot end effector 100 and facilitates easy attachment of head assembly 150 to cartridge bays 122.

Referring generally to FIG. 1 and particularly to, e.g., FIGS. 3 and 6C, head assembly 150 is configured for sliding attachment to, and sliding detachment from, cartridge bays 122, linearly along third axis 194, which is transverse to first axis 190 and to second axis 192. The preceding portion of this paragraph characterizes example fourteen of the subject matter, disclosed herein, where example fourteen also encompasses example thirteen, above.

Attaching and detaching head assembly 150 to and from cartridge bays 122 by sliding head assembly relative to cartridge bays 122 reduces a mechanical complexity of robot end effector 100 and facilitates easy attachment of head assembly 150 to cartridge bays 122.

Referring generally to FIG. 1 and particularly to, e.g., FIGS. 3, 4A, 7A, and 7B, each of two-part cartridges 104 further comprises lip 111. Head assembly 150 further comprises pairs of flexible clips 158. Each pair of pairs of flexible clips 158 is configured to receive lip 111 of a corresponding one of two-part cartridges 104 with a snap fit to attach two-part cartridges 104 to head assembly 150. The preceding portion of this paragraph characterizes example fifteen of the subject matter, disclosed herein, where example fifteen also encompasses example fourteen, above.

In one or more examples, each of two-part cartridges 104 includes lip 111 as a standard feature, extending around a portion of a perimeter of a top end of first-part container 106 and second-part container 108. Head assembly 150 includes pairs of flexible clips 158, extending from head assembly 150 along first axis 190. Clipping lip 111 to each one of pairs of flexible clips 158 provides a simple retention mechanism for two-part cartridges 104 that accommodates a wide dimensional tolerance for two-part cartridges 104.

Referring generally to FIG. 1 and particularly to, e.g., FIGS. 3, 4A, 7A, and 7B, pairs of flexible clips 158 prevent two-part cartridges 104 from moving relative to head assembly 150 along third axis 194 when two-part cartridges 104 are received with the snap fit by pairs of flexible clips 158. The preceding portion of this paragraph characterizes example sixteen of the subject matter, disclosed herein, where example sixteen also encompasses example fifteen, above.

Clipping lip 111 to pairs of flexible clips 158 provides a simple retention mechanism for two-part cartridges 104 that accommodates a wide dimensional tolerance for two-part cartridges 104. Additionally, snapping lip 111 into pairs of flexible clips 158 reduces a mechanical complexity of robot end effector 100 and facilitates easy attachment of head assembly 150 to cartridge bays 122.

Referring generally to FIG. 1 and particularly to, e.g., FIG. 3, head assembly 150 further comprises supply valves 154. Each of supply valves 154 is operable to selectively establish fluidic communication between pressurization source 199 and a corresponding one of pairs of fittings 152. The preceding portion of this paragraph characterizes example seventeen of the subject matter, disclosed herein, where example seventeen also encompasses any one of examples one to sixteen, above.

Supply valves 154 are each operable to selectively establish fluidic communication between pressure source 199 and a corresponding one of pairs of fittings 152 enables each of two-part cartridges 104 to be pressurized, in one-at-a-time fashion, when the corresponding one of cartridge bays 122, in which one of two-part cartridges 104 is received, is selectively moved to the predetermined position to establish fluidic communication with static mixer 101.

Referring generally to FIG. 1 and particularly to, e.g., FIGS. 3, 4A, 4B, and 5B, drive mechanism 140 is selectively operable to rotate static mixer 101 in a coupling direction to fluidically couple mixer inlet 103 with cartridge outlet 109 of the selected one of two-part cartridges 104 when cartridge bays 122 is in the predetermined position with respect to chassis 110. The preceding portion of this paragraph characterizes example eighteen of the subject matter, disclosed herein, where example eighteen also encompasses any one of examples one to seventeen, above.

Drive mechanism 140 is operable to selectively establish fluidic communication between pressure source 199 and a corresponding one of pairs of fittings 152 enables each of two-part cartridges 104 to be pressurized, in one-at-a-time fashion, when the corresponding one of cartridge bays 122, in which one of two-part cartridges 104 is received, is selectively moved to the predetermined position to establish fluidic communication with static mixer 101.

Referring generally to FIG. 1 and particularly to, e.g., FIGS. 3, 4A, 4B, and 8, after drive mechanism 140 rotates static mixer 101 in a decoupling direction, which is opposite to the coupling direction, to fluidically decouple mixer inlet 103 from cartridge outlet 109 of the selected one of two-part cartridges 104, and cartridge bays 122 are moved, with respect to chassis 110, along first axis 190 away from the predetermined position to establish gap 198 between mixer inlet 103 and cartridge outlet 109 of the selected one of two-part cartridges 104, drive mechanism 140 is selectively operable to rotate static mixer 101 a predetermined number of turns in the coupling direction or in the decoupling direction. The preceding portion of this paragraph characterizes example nineteen of the subject matter, disclosed herein, where example nineteen also encompasses example eighteen, above.

Drive mechanism 140 is operable to selectively establish fluidic communication between static mixer 101 and mixer inlet 103 by rotating static mixer 101 in either the decoupling direction or the coupling direction a predetermined number of turns. Cartridge bays 122 are then moved, with respect to chassis 110, along first axis 190 away from the predetermined position to establish gap 198 between mixer inlet 103 and cartridge outlet 109 of the selected one of two-part cartridges 104 to enable each of two-part cartridges 104 to be selectively positioned for extrusion of the contents into static mixer 101 in one-at-a-time fashion.

Referring generally to FIG. 1 and particularly to, e.g., FIGS. 3 and 8, drive mechanism 140 is configured to generate rotational power about power-generation axis 141 and to transfer the rotational power to power-application axis 143. Power-generation axis 141 and power-application axis 143 are parallel to first axis 190, and power-generation axis 141 is offset from power-application axis 143 along second axis 192. The preceding portion of this paragraph characterizes example twenty of the subject matter, disclosed herein, where example twenty also encompasses any one of examples one to nineteen, above.

Drive mechanism 140 is configured to transfer rotational power from power-generation axis 141 to power-application axis 143 to provide a mechanically simple and efficient transfer of rotational power from drive mechanism 140 to static mixer 101.

Referring generally to FIG. 1, drive mechanism 140 comprises drive motor 142, first spool 144, rotatable by drive motor 142 relative to chassis 110, and second spool 146, configured to receive static mixer 101 therethrough, such that static mixer 101 does not rotate relative to second spool 146. Drive mechanism 140 also comprises drive loop 148, coupling second spool 146 to first spool 144 such that when first spool 144 is rotated by drive motor 142 relative to chassis 110, second spool 146 is also rotated relative to chassis 110. The preceding portion of this paragraph characterizes example twenty-one of the subject matter, disclosed herein, where example twenty-one also encompasses any one of examples one to twenty, above.

Drive mechanism 140 includes drive motor 142, first spool 144, drive loop 148, and second spool 146 in order to couple or decouple static mixer 101 and mixer inlet 103. Drive motor 142 rotates first spool 144, and first spool 144 rotates drive loop 148. Drive loop 148 rotates second spool 146, and second spool 146 rotates static mixer 101 relative to mixer inlet 103 to couple or decouple static mixer 101 and mixer inlet 103. Accordingly, drive motor 142, first spool 144, drive loop 148, and second spool 146 transfer rotational power from drive motor 142 to second spool 146 to provide a mechanically simple and efficient transfer of rotational power from drive motor 142 to static mixer 101.

Referring generally to FIG. 1 and particularly to, e.g., FIGS. 3 and 8, second spool 146 is supported by mixer mount 118 and is rotatable relative to mixer mount 118. The preceding portion of this paragraph characterizes example twenty-two of the subject matter, disclosed herein, where example twenty-two also encompasses example twenty-one, above.

Second spool 146 is supported by mixer mount 118 and is rotatable relative to mixer mount 118 to provide a mechanically simple and efficient transfer of rotational power from second spool 146 to static mixer 101.

Referring generally to FIG. 1 and particularly to, e.g., FIGS. 2 and 3, robot end effector 100 further comprises connector 180, attached to chassis 110. Dispensing valve 130 and drive motor 142 are controllable by signals, received through connector 180. The preceding portion of this paragraph characterizes example twenty-three of the subject matter, disclosed herein, where example twenty-three also encompasses example twenty-one or twenty-two, above.

Connector 180 facilitates simple and efficient electrical connection of dispensing valve 130, first actuator 160, and second actuator 170 to a source of control signals. In one or more examples, the control signals control first actuator 160 and second actuator 170 to move cartridge bays 122 relative to chassis 110 along first axis 190 and second axis 192 to the predetermined position with respect to chassis 110 and static mixer 101, and/or to decouple cartridge outlet 109 from mixer inlet 103 and move the next one of cartridge bays 122 into alignment with static mixer 101. In one or more examples, the control signals control dispensing valve 130 to deposit extrudable substance 102 via valve outlet 134.

In one or more examples, connector 180 is a quick-change connector, configured to interface mechanically with an arm of a robot (not shown), so as to attach robot end effector 100 physically to the robot, and electrically with a control system (not shown) of the robot, so as to enable and integrate control of dispensing valve 130, first actuator 160, and second actuator 170 with the control logic of the robot.

Referring generally to FIG. 1 and particularly to, e.g., FIGS. 3 and 8, drive motor 142 is a bi-directional DC motor. The preceding portion of this paragraph characterizes example twenty-four of the subject matter, disclosed herein, where example twenty-four also encompasses any one of examples twenty-one to twenty-three, above.

Implementation of drive motor 142 as a bi-directional DC motor enables precise and accurate rotation of static mixer 101 relative to mixer inlet 103 to couple or decouple static mixer 101 and mixer inlet 103 the predetermined number of turns in the coupling direction or in the decoupling direction.

Referring generally to FIG. 1 and particularly to, e.g., FIGS. 3, 4A, and 4B, cartridge bays 122 are each oriented length-wise along first axis 190. Cartridge bays 122 are also arranged side-by-side along second axis 192. When two-part cartridges 104 are received by cartridge bays 122, first-part container 106 and second-part container 108 of each of two-part cartridges 104 are oriented side-by-side along third axis 194. Third axis 194 is transverse to first axis 190 and to second axis 192. The preceding portion of this paragraph characterizes example twenty-five of the subject matter, disclosed herein, where example twenty-five also encompasses any one of examples one to twenty-four, above.

Cartridge bays 122 arranged side-by-side along second axis 192, and first-part container 106 and second-part container 108 of each of two-part cartridges 104 oriented side-by-side along third axis 194, provides efficient packing of two-part cartridges 104 within robot end effector 100 while enabling easy insertion and removal of two-part cartridges 104.

Referring generally to FIG. 1 and particularly to, e.g., FIG. 3, cartridge bays 122 collectively form cartridge-bay assembly 120, comprising walls 124, which are parallel to one another. Each of cartridge bays 122 is defined by a corresponding pair of walls 124, adjacent to each other. The preceding portion of this paragraph characterizes example twenty-six of the subject matter, disclosed herein, where example twenty-six also encompasses any one of examples one to twenty-five, above.

Walls 124 of cartridge-bay assembly 120 facilitate easy insertion and removal of two-part cartridges 104 from robot end effector 100.

Referring generally to FIG. 1 and particularly to, e.g., FIG. 3, cartridge bays 122 are equal in number to pairs of fittings 152. The preceding portion of this paragraph characterizes example twenty-seven of the subject matter, disclosed herein, where example twenty-seven also encompasses any one of examples one to twenty-six, above.

Pairs of fittings 152 and cartridge bays 122 being equal in number avoids a need to attach a single pair of fittings to each of cartridge bays 122 in succession.

Referring generally to FIG. 1 and particularly to, e.g., FIG. 3, chassis 110 comprises first end 114 and second end 116, opposite first end 114 along first axis 190. Cartridge bays 122 extend from first end 114 of chassis 110, and dispensing valve 130 extends from second end 116 of chassis 110. The preceding portion of this paragraph characterizes example twenty-eight of the subject matter, disclosed herein, where example twenty-eight also encompasses any one of examples one to twenty-seven, above.

Chassis 110 supports cartridge bays 122 and dispensing valve 130 such that cartridge bays 122 extend from first end 114 of chassis 110 and dispensing valve 130 extends from second end 116 of chassis 110. The position of cartridge bays 122 relative to first end 114 of chassis 110 facilitates easy insertion and removal of two-part cartridges 104 from robot end effector 100. The position of dispensing valve 130 relative to second end 116 of chassis 110 facilitates easy dispensing of extrudable substance 102.

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

The invention claimed is:

1. A robot end effector for dispensing an extrudable substance, the robot end effector comprising:
 a chassis;
 a mixer mount, extending from the chassis and configured to rotatably receive a static mixer that comprises a mixer inlet and a mixer outlet, which is in fluidic communication with the mixer inlet;
 cartridge bays, extending from the chassis, wherein:
  each one of the cartridge bays is shaped to receive a corresponding one of two-part cartridges;

each one of the two-part cartridges comprises a cartridge outlet; and fluidic communication between the cartridge outlet of a selected one of the two-part cartridges and the mixer inlet is established when the cartridge bays are moved to a predetermined position with respect to the chassis, linearly along a first axis and linearly along a second axis, which is transverse to the first axis;

a drive mechanism, attached to the chassis and selectively operable to rotate the static mixer relative to the cartridge bays when the static mixer is received by the mixer mount;

a dispensing valve, attached to the chassis and comprising a valve inlet and a valve outlet, wherein:

the valve outlet is in selective fluidic communication with the valve inlet; and the valve inlet is in fluidic communication with the mixer outlet when the static mixer is received by the mixer mount; and a head assembly, comprising pairs of fittings, and wherein each of the pairs of fittings is configured to selectively supply compressed air from a pressure source to contents of a corresponding one of the two-part cartridges when the two-part cartridges are received by the cartridge bays and the cartridge bays are translated along the first axis and along the second axis relative to the chassis so that the cartridge outlet of the corresponding one of the two-part cartridges is in fluidic communication with the mixer inlet.

2. The robot end effector according to claim 1, further comprising a first actuator, attached to the chassis and operable to move the cartridge bays bi-directionally with respect to the chassis, linearly along the first axis.

3. The robot end effector according to claim 2, wherein: the first actuator comprises:

a bracket, fixed to one of the chassis or to the cartridge bays; and at least one rail, fixed to the other of the chassis or the cartridge bays and oriented parallel to the first axis; and at least the one rail is coupled to the bracket and is movable relative to the bracket.

4. The robot end effector according to claim 2, further comprising a connector, attached to the chassis, wherein the dispensing valve and the first actuator are controllable by signals, received through the connector.

5. The robot end effector according to claim 2, further comprising a second actuator, attached to the chassis and operable to move the cartridge bays bi-directionally with respect to the chassis, linearly along the second axis.

6. The robot end effector according to claim 5, further comprising an actuator interface, wherein:

the first actuator is configured to translate the actuator interface relative to the chassis; and the second actuator is operable to move the cartridge bays bi-directionally with respect to the actuator interface, linearly along the second axis.

7. The robot end effector according to claim 6, further comprising a threaded drive rod, operatively interconnecting the second actuator and the cartridge bays, wherein the second actuator is operable to selectively rotate the threaded drive rod to selectively move the cartridge bays relative to the chassis, linearly along the second axis.

8. The robot end effector according to claim 7, further comprising:

a support, fixed to the actuator interface and comprising a drive-rod bearing, configured to rotationally support the threaded drive rod; and a carrier, fixed to the cartridge bays and comprising a drive-rod opening, though which the threaded drive rod is threadably received.

9. The robot end effector according to claim 8, further comprising a guide rod, fixed to the support and oriented parallel to the threaded drive rod, wherein:

the carrier further comprises a guide-rod opening; and the guide rod is slidably received through the guide-rod opening.

10. The robot end effector according to claim 1, wherein: the head assembly comprises at least one first magnet; and the cartridge bays comprise at least one second magnet, configured to be magnetically couple with at least the one first magnet.

11. The robot end effector according to claim 10, wherein the head assembly is configured for sliding attachment to, and sliding detachment from, the cartridge bays, linearly along a third axis, which is transverse to the first axis and to the second axis.

12. The robot end effector according to claim 11, wherein: each of the two-part cartridges further comprises a lip;

the head assembly further comprises pairs of flexible clips; and each pair of the pairs of flexible clips is configured to receive the lip of a corresponding one of the two-part cartridges with a snap fit to attach the two-part cartridges to the head assembly.

13. The robot end effector according to claim 12, wherein the pairs of flexible clips prevent the two-part cartridges from moving relative to the head assembly along the third axis when the two-part cartridges are received with the snap fit by the pairs of flexible clips.

14. The robot end effector according to claim 1, wherein: the head assembly further comprises supply valves; and each of the supply valves is operable to selectively establish fluidic communication between the pressurization source and a corresponding one of the pairs of fittings.

15. The robot end effector according to claim 1, wherein the drive mechanism is selectively operable to rotate the static mixer in a coupling direction to fluidically couple the mixer inlet with the cartridge outlet of the selected one of the two-part cartridges when the cartridge bays are in the predetermined position with respect to the chassis.

16. The robot end effector according to claim 15, wherein, after the drive mechanism rotates the static mixer in a decoupling direction, which is opposite to the coupling direction, to fluidically decouple the mixer inlet from the cartridge outlet of the selected one of the two-part cartridges, and the cartridge bays are moved, with respect to the chassis, along the first axis away from the predetermined position to establish a gap between the mixer inlet and the cartridge outlet of the selected one of the two-part cartridges, the drive mechanism is selectively operable to rotate the static mixer a predetermined number of turns in the coupling direction or in the decoupling direction.

17. The robot end effector according to claim 1, wherein: the drive mechanism is configured to generate rotational power about a power-generation axis and to transfer the rotational power to a power-application axis;

the power-generation axis and the power-application axis are parallel to the first axis; and the power-generation axis is offset from the power-application axis along the second axis.

18. The robot end effector according to claim 1, wherein the drive mechanism comprises:
   a drive motor;
   a first spool, rotatable by the drive motor relative to the chassis;
   a second spool, configured to receive the static mixer therethrough, such that the static mixer does not rotate relative to the second spool; and
   a drive loop, coupling the second spool to the first spool such that when the first spool is rotated by the drive motor relative to the chassis, the second spool is also rotated relative to the chassis.

19. The robot end effector according to claim 18, wherein the second spool is supported by the mixer mount and is rotatable relative to the mixer mount.

20. The robot end effector according to claim 18, further comp sing a connector, attached to the chassis, wherein the dispensing valve and the drive motor are controllable by signals, received through the connector.

* * * * *

UNITED STATES PATENT AND TRADEMARK OFFICE
CERTIFICATE OF CORRECTION

| | | |
|---|---|---|
| PATENT NO. | : 11,583,876 B2 | Page 1 of 1 |
| APPLICATION NO. | : 17/470508 | |
| DATED | : February 21, 2023 | |
| INVENTOR(S) | : John Walter Pringle, IV, Angelica Davancens and Derek Nelson | |

It is certified that error appears in the above-identified patent and that said Letters Patent is hereby corrected as shown below:

In the Claims

In Claim 20, Column 15, Line 19, please change "comp sing a connector" to -- comprising a connector --

Signed and Sealed this
Twenty-first Day of March, 2023

*Katherine Kelly Vidal*

Katherine Kelly Vidal
*Director of the United States Patent and Trademark Office*